United States Patent [19]
Suzuki et al.

[11] Patent Number: 5,856,712
[45] Date of Patent: Jan. 5, 1999

[54] UNINTERRUPTIBLE POWER SUPPLY METHOD

[75] Inventors: Yasunobu Suzuki, Koganei; Isao Sugawara, Warabi, both of Japan

[73] Assignees: I-Hits Laboratory, Kanagawa; Chiyoda Corporation, Saitama, both of Japan

[21] Appl. No.: 838,052

[22] Filed: Apr. 22, 1997

[30] Foreign Application Priority Data

Dec. 5, 1996 [JP] Japan ................................. 8-325771

[51] Int. Cl.⁶ ............................................... H02J 7/00
[52] U.S. Cl. .......................... 307/64; 307/66; 307/87; 363/9; 363/34
[58] Field of Search ................................. 307/43, 44, 64, 307/65, 66, 80, 85, 86, 87; 363/34, 37, 9, 10

[56] References Cited

U.S. PATENT DOCUMENTS

| 5,029,064 | 7/1991 | Ball | 363/65 |
| 5,334,877 | 8/1994 | Mohan et al. | 307/46 |
| 5,363,286 | 11/1994 | Tsuchiya | 363/8 |
| 5,483,463 | 1/1996 | Qin et al. | 364/492 |
| 5,598,326 | 1/1997 | Liu et al. | 363/34 |

*Primary Examiner*—Richard T. Elms
*Assistant Examiner*—Jonathan S. Kaplan
*Attorney, Agent, or Firm*—Wenderoth, Lind & Ponack, L.L.P.

[57] ABSTRACT

A method for providing an uninterruptible power supply to a load both at ordinary times and in an emergency. At ordinary times, commercial AC input power is modulated into high-frequency AC power, which is then applied to a primary winding of a high-frequency transformer having the primary winding, a secondary winding and a tertiary winding. High-frequency AC power induced in the secondary winding from the primary winding is demodulated into AC output power, which is then supplied to the load. High-frequency AC power induced in the tertiary winding from the primary winding is rectified into DC power, with which a storage battery is charged. In an emergency, DC power from the storage battery is converted into high-frequency AC power, which is then applied to the tertiary winding. High-frequency AC power induced in the secondary winding from the tertiary winding is averaged, thereby producing AC output power, then the AC output power is supplied to the load.

35 Claims, 17 Drawing Sheets

PHASE DIFFERENCE: 135°

PHASE DIFFERENCE: 180°

UNINTERRUPTIBLE POWER SUPPLY METHOD

FIELD OF THE INVENTION

The present invention relates to a method of providing an uninterruptible power supply to a load, both at ordinary times and in emergencies, with excellent efficiency and power factor and, more particularly, to a method which can achieve a compact, light-weight and low-cost uninterruptible power supply apparatus(UPS) excellent in efficiency and power factor.

PRIOR ART

An uninterruptible power supply apparatus(UPS) is generally used for keeping characteristics, such as voltage, frequency and waveform, of power supplied to a load constant even upon occurrence of service interruption, voltage drop, surge and the like in a commercial power supply system. The demand from plants and offices for such a UPS is increasing with a view to prevent an information processing apparatus, such as a personal computer, a workstation and an office computer, or a terminal machine, a gateway and a server which operate 24-hour continuously in connection with communication lines or local area networks, from malfunctioning and being inoperable.

FIG. 1 illustrates a schematic block diagram of a conventional UPS. The conventional UPS shown in FIG. 1 may be operated by any of two conventional methods: (1) supplying, at ordinary times, commercial AC input power provided through a commercial AC input terminal 1 from an AC power source(not shown) to a load 11 via a noise filter 2 which removes noises which may exist in the AC input power and a commercial AC direct supply wiring 3 which provides a current path connecting an output of the noise filter 2 directly to one terminal of a change-over switch 10, and only in an emergency such as a service interruption, switching the change-over switch 10 to the other terminal which connects an output of an insulating transformer 9 to the load 11, thereby supplying power from a storage battery 7 to the load 11 via a DC-AC inverter 8 which inverts DC power stored in the storage battery 7 to AC power and the insulating transformer 9, and (2) connecting the change-over switch 10 to the insulating transformer 9 at all times, that is both at ordinary times and in emergency, thereby always supplying AC power from the AC power source via the storage battery 7 to the load 11 without passing the commercial AC direct supply wiring 3.

However, in the case of the conventional method (1), because of a short time lag which exists between times of detecting the emergency and switching the change-over switch 10 upon the detection, it is necessary to store energy in a power factor compensator 12 or a DC-DC converter 13 in order to compensate for the instantaneous power supply interruption caused by the time lag. Thus, a power-efficiency of the UPS is decreased.

In the case of the conventional method (2), although there exists no occurrence of instantaneous interruption of power supply, an efficiency of the UPS is lower than 70% which is the product of an efficiency of about 80% of the power factor compensator 4 and DC-DC converter 5 and the an efficiency of about 80–85% of the DC-AC inverter 8. As a result, more than 30% of the commercial AC input power is being wasted when the UPS is operated with this conventional method.

For example, in order to supply power to a load of 1 kVA, i.e., to obtain an output of 1 kW, each of outputs of the power factor compensator 4, the DC-AC inverter 8 and the insulating transformer 9 in the conventional UPS is required to be about 1.4 kW, about 1.1 kW and about 1 kVA, respectively. Consequently, the conventional UPS requires a very large capacity, resulting in a large size and a heavy weight of, for example, ten and odds kg, or several kg even when the insulating transformer 9 is not installed, and inevitably an increased cost.

Additionally, in the conventional UPS, as a circuit for coping with harmonics which may exist in a power source, at least two of the power factor compensators 4 and 12 are required to be installed for the output of the noise filter 2 and for the load, respectively, thereby preventing further simplification of the circuit and downsizing of the UPS apparatus.

SUMMARY OF THE INVENTION

In view of the foregoing, it is the main object of the present invention to provide a novel method of providing an uninterruptible power supply to a load, both at ordinary times and in an emergency, with excellent efficiency and power factor, which achieves an uninterruptible power supply excellent in efficiency and power factor, small in size, light in weight, and low in cost.

BRIEF DESCRIPTION OF THE DRAWINGS

The foregoing and other objects, features and advantages of the present invention will be better understood from the following detailed description, taken in conjunction with the accompanying drawings, in which.

DETAILED DESCRIPTION OF THE INVENTION

Figure 1:
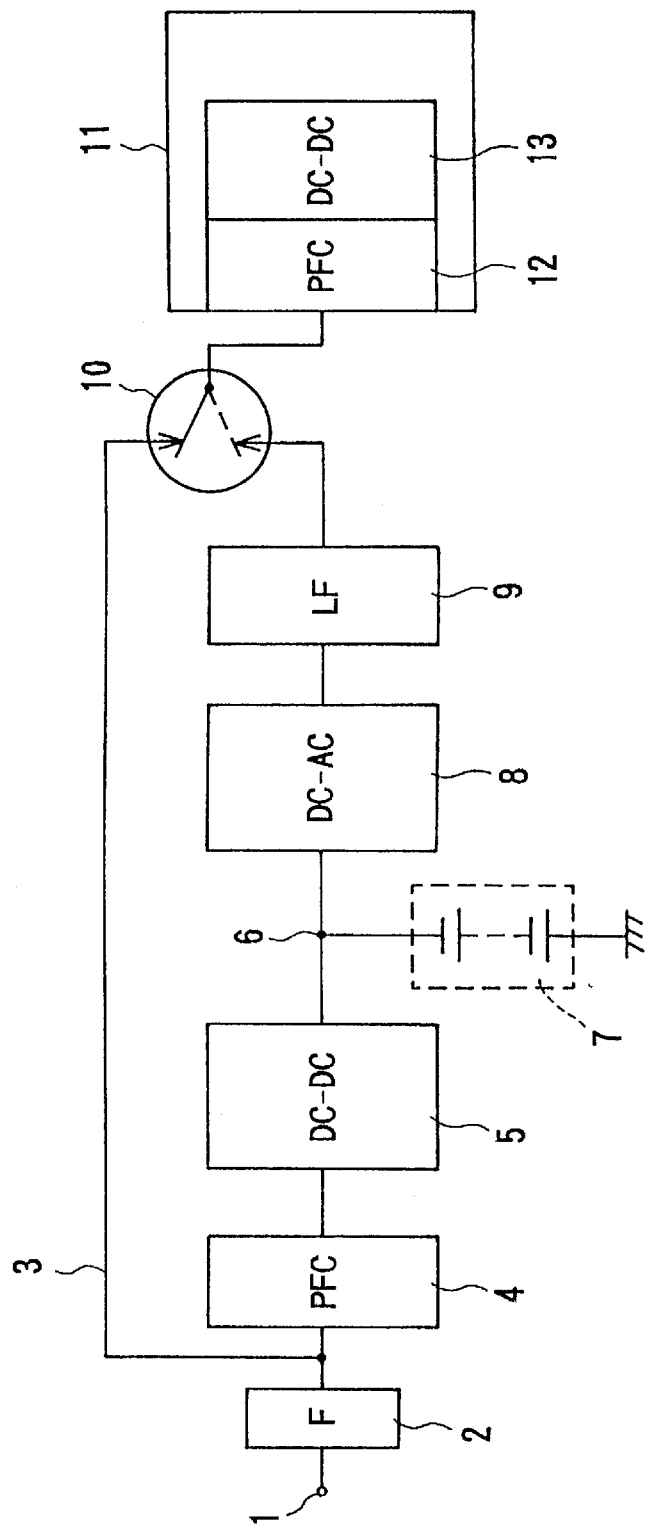
FIG. 1 is a schematic block representation of a conventional uninterruptible power supply.
Figure 2:
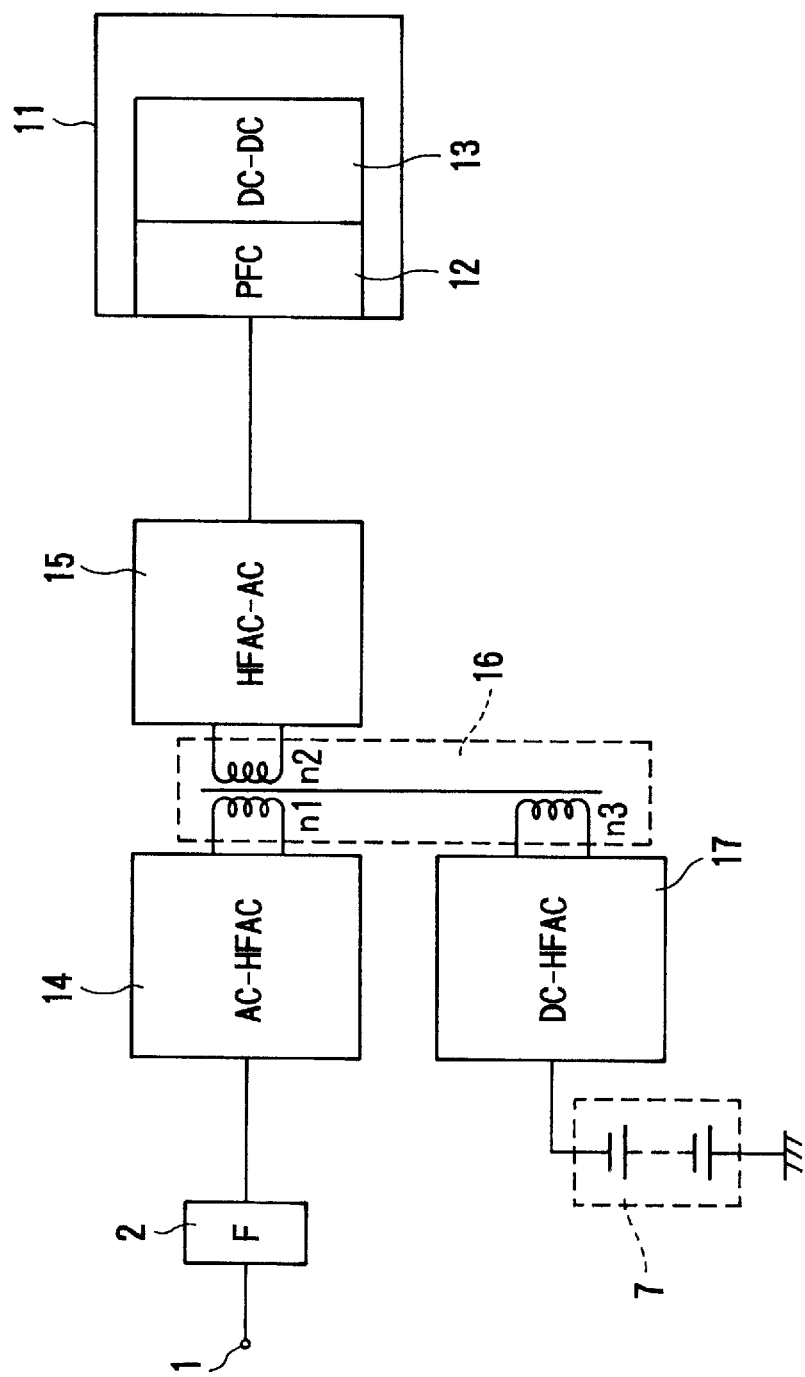
FIG. 2 is a schematic block representation of an uninterruptible power supply in accordance with the method of the present invention.

FIG. 2 shows a schematic block representation of an UPS in accordance with the method of the present invention. In the depicted UPS, an AC-HFAC converter 14 is coupled with a primary winding n1 of a high-frequency transformer 16 having the primary winding n1, a secondary winding n2 and a tertiary winding n3, and a HFAC-AC 15 is coupled between the secondary winding n2 and the load 11. Also, a DC-HFAC converter 17 is coupled between the tertiary winding n3 and the storage battery 7. The high-frequency transformer 16 operates at frequencies ranging from some kHz to some ten kHz, for example. The other components shown in FIG. 2 which could be the same as those in the conventional UPS of FIG. 1 are numbered similarly as in FIG. 1.

This UPS of FIG. 2 operates in two operation modes: ordinary times mode and emergency mode, which are for operation at ordinary times and in an emergency, respectively, in accordance with the method of the present invention.

In the ordinary times mode of operation, commercial AC input power provided by a AC power source(not shown) through the commercial AC input terminal 1 and the noise filter 2 is modulated into high-frequency AC power, which is then applied to the primary winding n1 of the high-frequency transformer 16, by the AC-HFAC converter 14. High-frequency AC power induced in the secondary winding n2 from the primary winding n1 is demodulated into AC output power which is approximately equivalent to the commercial AC input power and has a waveform similar to the that of the commercial AC input power by the HFAC-AC converter 15. Then, the AC output power is supplied to the load 11 from an output of the HFAC-AC converter 15.

On the other hand, in the tertiary winding n3 of the high-frequency transformer 16, high-frequency AC power is induced from the primary winding n1. This induced high-frequency AC power is converted into DC power by the DC-HFAC converter 17. Then, with the DC power, the storage battery 7 is charged.

In the emergency mode of operation, i.e., in an emergency, energy stored in the storage battery 7 is used for supplying power to the load 11. DC power from the storage battery 7 is converted into high-frequency AC power, which is then applied to the tertiary winding n3, by the DC-HFAC converter 17. In the secondary winding n2, high-frequency AC power is induced from the tertiary winding n3. This induced high-frequency AC power is averaged by the HFAC-AC converter 15, thereby producing stable AC output power. Then, the AC output power is supplied stably to the load 11 from the output of the HFAC-AC converter 15.

The UPS shown in FIG. 2 performs modulation of AC input power into high-frequency AC power and demodulation of high-frequency AC power into AC output power by means of the AC-HFAC converter 14 and the HFAC-AC converter 15, respectively, as described above. Accordingly, it is possible to accomplish insulation and voltage conversion at the turn ratio of the primary winding n1 to the secondary winding n2 only by passing through one electronic transformer, and hence to easily obtain AC output power of a desired voltage.

The storage battery 7 is usually in a state of being charged replenishingly only for its spontaneous discharge. Thus, the power necessary for charging the storage battery 7, i.e., the power taken out from the tertiary winding n3 is less than a few percent of the power supplied to the load 11 during the ordinary times mode of operation. Consequently, the increment of output capacity of the AC-HFAC converter 14 for such small power is very slight and poses no problem as to the efficiency or scale of the apparatus as a whole, making it possible for the present invention to achieve a UPS far smaller in size and lighter in weight than a conventional UPS such as the one shown in FIG. 1.

Furthermore, since there exists practically no difference between a waveform of the commercial AC input power and that of the AC output power in the UPS of FIG. 2, an insulating transformer such as the one used in the conventional UPS of FIG. 1 is not necessary as shown in FIG. 2. Therefore, the present invention can achieve a UPS with simplified and downsized circuitry, thereby making the apparatus much smaller and lighter than any of the conventional UPSs which have been developed heretofore.

As depicted in FIG. 1, in the conventional UPS, the power factor compensator 4 and the DC-DC converter 5 which are functioning together as a battery charger having a power capacity larger than the output power capacity of the UPS for the purpose of replenishing large decrease in efficiency, the DC-AC inverter 8 and the insulating transformer 9 corresponding to the output power capacity must be connected in tandem with the load 11, thereby causing lower efficiency and scaling-up of the apparatus. However, as shown in FIG. 2, in the UPS in accordance with the method of the present invention, the DC-HFAC converter 17 functioning as a battery charger is connected in parallel with the load 11. As a result, the present invention improves an efficiency in supplying power uninterruptedly to a load, and thereby achieves a UPS excellent in efficiency when compared with that of the conventional UPS.

In addition, the present invention accomplishes each step of modulation, demodulation, rectification, DC-AC conversion, averaging and smoothing very smoothly and stably by using semiconductor switches and by modulating and inverting drive-pulse phases of the semiconductor switches, and moreover, adjusts an amplitude of the voltage of AC output power easily. As such, semiconductor switches, bi-directional semiconductor switches, or uni-directional semiconductor switches may be used.

As described above, according to the method of the present invention, it is possible to achieve a compact, light-weight and low-cost UPS excellent in efficiency and power factor.

Figure 3:
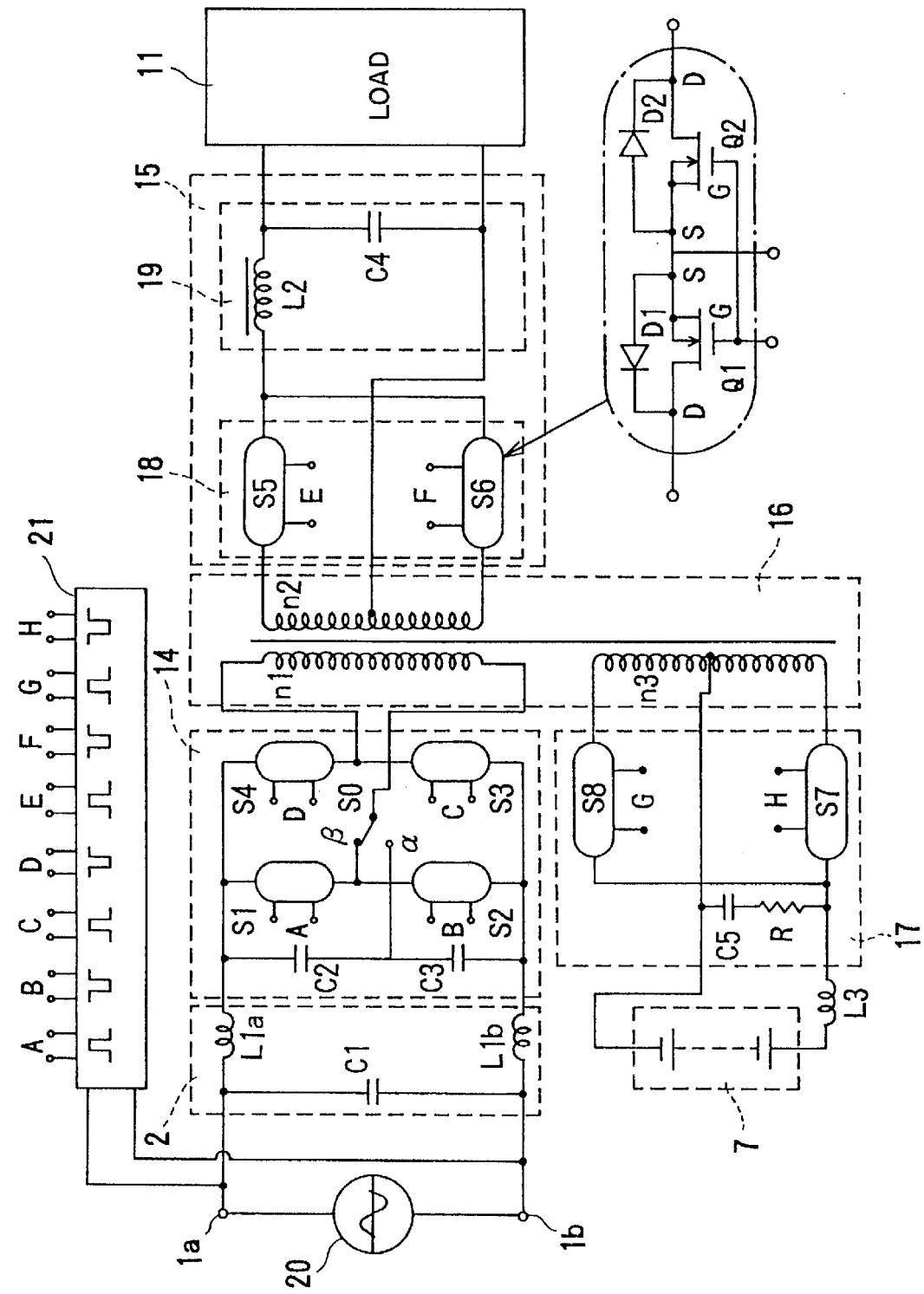
FIG. 3 is a schematic circuit diagram of an uninterruptible power supply in accordance with the method of the present invention.

Referring now to FIG. 3, a schematic circuit diagram of an UPS as a preferred embodiment of the present invention is shown.

In the embodiment, a noise filter 2 is composed of inductors L1$a$ and L1$b$ and a capacitor C1, and an AC-HFAC converter 14 is composed of capacitors C2 and C3, semiconductor switches S1, S2, S3 and S4, and an input change-over switch S0. A synchronous rectifier 18 which demodulates high-frequency AC power into AC output power is composed of semiconductor switches S5 and S6. A smoothing filter 19 which removes harmonic components of the AC output power is composed of an inductor L2 and a smoothing capacitor C4. And, the synchronous rectifier 18 and the smoothing filter 19 together constitute an HFAC-AC converter 15. A high-frequency transformer 16 has a primary winding n1, a secondary winding n2 and a tertiary winding n3. A DC-HFAC converter 17 is composed of semiconductor switches S7 and S8, a resistance R and a capacitor C5. A storage battery 7 is composed of a plurality of cells connected in series with each other. Also, a control circuit 21 which performs modulation and inversion of a drive-pulse phase of each of the semiconductor switches S1, S2, S3, S4, S5, S6, S7 and S8 are coupled to the circuit.

As shown, an input terminal 1$a$ for the input of commercial AC input power from a commercial AC power source 20 are connected to an end of the inductor L1$a$ and an end of the capacitor C1 which together serve as one of input terminals of the noise filter 2. And the other input terminal 1$b$ is connected to an end of the inductor L1$b$ and the other end of the capacitor C1 which together serve as another one of the input terminals of the noise filter 2. The other end of the inductor L1$a$ serving as an output end of the noise filter 2 is connected to an end of the capacitor C2 and an end of each of the semiconductor switches S1 and S4 which together form an input end of the AC-HFAC converter 14. The other end of the inductor L1$b$ serving as the other output end of the noise filter 2 is connected to an end of the capacitor C3 and an end of each of the semiconductor switches S2 and S3 which together form the other input end of the AC-HFAC converter 14. The other ends of the capacitors C2 and C3 are connected to each other and also to a contact point a of the change-over switch S0. The other end of the semiconductor switch S1 and the other end of the semiconductor switch S2 are connected to each other and also to a contact point β of the change-over switch S2. The other ends of the semiconductor switches S3 and S4 are connected to each other and also to an end of the primary winding n1 of the high-frequency transformer 16. And, a common of the change-over switch S0 is connected to the other end of the primary winding n1.

The change-over switch S0 is to be connected to the contact point β when the AC input voltage is 100V or 100 and odds V so that the AC-HFAC converter 14 serves as a bridge converter and to the contact point α when AC input voltage is 200V or 200 and odds V so that the AC-HFAC converter 14 serves as a half-bridge converter. In FIG. 3, this change-over switch S0 is connected to the contact point β.

An end and the other end of the secondary winding n2 of the high-frequency transformer 16 are connected, respectively, to an end of the semiconductor switch S5 serving as an input end of the synchronous rectifier 18 and to an end of the semiconductor switch S6 serving as the other input end of the synchronous rectifier 18. The other end of the semiconductor switch S5 serving as an output end of the synchronous rectifier 18 and the other end of the semiconductor switch S6 serving as the other output end of the synchronous rectifier 18 are connected to each other and to an end of the inductor L2. The mid-point of the secondary winding n2 is connected to an end of the capacitor C4 and also to the load 11 through an output end of the smoothing filter 19. The other end of the inductor L2 is connected to the other end of the capacitor C4 and also to the load 11 through the other output end of the smoothing filter 19. The input ends of the synchronous rectifier 18 and the output ends of the smoothing filter 19 correspond to input ends and output ends of the HFAC-AC converter 15, respectively.

Further, one end and the other end of the tertiary winding n3 of the high-frequency transformer 16 are connected, respectively, to an end of the semiconductor switch S7 which is an input end of the DC-HFAC inverter 17 and to an end of the semiconductor switch S8 which is the other input end of the DC-HFAC inverter 17. The other end of the semiconductor switch S7 and the other end of the semiconductor switch S8 are connected to each other and also to an end of the resistor R. The mid-point of the tertiary winding n3 is connected to an end of the capacitor C5 and to a negative terminal of the storage battery 7 through an output end of the DC-HFAC inverter 17. The other end of the resistor R and the other end of the capacitor C5 are connected to each other. The other output end of the DC-HFAC inverter 17 is connected to an end of the inductor L3, and the other end of the inductor L3 is connected to a positive terminal of the storage battery 7.

In addition, the control circuit 21 is connected across a line which is between the input terminal 1$a$ and one of the input ends of the noise filter 2 and a line which is between the input terminal 1$b$ and the other one of the input ends of the noise filter 2. Also, control outputs A, B, C, D, E, F, G and H of the control circuit 21 are coupled to the control terminals A, B, C, D, E, F, G and H of the semiconductor switches S1, S2, S3, S4, S5, S6, S7 and S8, respectively.

Each of the semiconductor switches S1, S2, S3, S4, S5, S6, S7 and S8 may be a bi-directional AC switch constituted by uni-directional semiconductor switches such as MOSFETs and connected back-to-back as shown in the partially enlarged view in FIG. 3, for example. With such a configuration, that is the back-to-back connection of uni-directional semiconductor switches, it is possible to transfer electric energy from input to output, or vice versa, and moreover to control AC current, thus providing properties equivalent to those of a transformer.

In the partially enlarged view in FIG. 3, MOSFETs are used as semiconductor devices Q1 and Q2, for example. As shown, sources S, each serving as one pole of a controlled terminal of each of the semiconductor devices Q1 and Q2, are connected to each other. AC power to be controlled is applied between drains D, each serving as another pole of the controlled terminal of each of the semiconductor devices Q1 and Q2. Each of the diodes D1 and D2 are connected between the drain D and source S of the semiconductor devices Q1 and Q2, respectively, in a direction counter to the direction of supply, i.e., a direction from the drain D toward the source S. Thus, a cathode is connected on the drain D side and an anode is connected on the source S side of each MOSFET. By applying a common control signal into gates G, each serving as a control terminal of each of the semiconductor devices Q1 and Q2, alternating current can be controlled. More specifically, when the semiconductor switches Q1 and Q2 which are MOSFETS in this figure are turned on, in half a cycle of alternating current, current flows through either one or both of the route which is the drain D(of the semiconductor device Q1)—source S(of the semiconductor device Q1)—diode D2 and the route which is the source S(of the semiconductor device Q2)—drain D(of the semiconductor device Q2), and in the next half cycle of the alternating current, current flows through either one or both of the route which is the drain D(of the semiconductor device Q2)—source S(of the semiconductor device Q2)—diode D1 and the route which is the source S(of the semiconductor device Q1)—drain D(of the semiconductor device Q1). It is not always necessary to use such diodes D1 and D2 since similar effects can be obtained by utilizing features of synchronous rectification by the semiconductor devices Q1 and Q2 in specific conditions of a voltage resistance or current capacity.

The UPS of FIG. 3 operates in two operation modes: ordinary times mode and emergency mode, which are for operation at ordinary times and in emergency, respectively, in accordance with the method of the present invention.

In the ordinary times mode of operation, commercial AC input power provided from the commercial AC power source 20 via the commercial AC input terminals 1a and 1b is applied to the AC-HFAC converter 14 through the noise filter 2.

In the AC-HFAC converter 14, when the semiconductor switches S1 and S3 and the semiconductor switches S2 and S4 are alternately on-off controlled with the on-off period sufficiently high as compared with the frequency of the commercial AC input power, the semiconductor switches S1 and S3 and the semiconductor switches S2 and S4 are alternately turned on between two routes having different directions relative to the high-frequency transformer 16, that is, the route of the semiconductor switch S1—the high-frequency transformer 16—the semiconductor switch S3, and the route of the semiconductor switch S4—the high-frequency transformer 16—the semiconductor switch S2. Thus, the commercial AC input power is envelope-modulated into high-frequency AC power with the commercial frequency.

The modulated high-frequency AC power is then applied to the primary winding n1 of the high-frequency transformer 16. In the secondary winding n2 and the tertiary winding n3, high-frequency AC power is induced from the primary winding n1. A voltage of the high-frequency AC power can be set arbitrarily by adjusting the turn ratio of the primary winding n1 to the secondary winding n2 or the tertiary winding n3 of the high-frequency transformer 16.

The high-frequency AC power induced in the secondary winding n2 is then applied to the HFAC-AC converter 15. In the HFAC converter 15, the high-frequency AC power is first applied to the synchronous rectifier 18, in which, for example, the semiconductor switch S5 is driven synchronously with the semiconductor switches S1 and S3, and the semiconductor switch S6 is driven synchronously with the semiconductor switches S2 and S4. That is, the semiconductor switches S5 and S6 are driven so that current always flows only in one direction during each of half cycles of the alternating current. Therefore, the waveform of the high-frequency AC power is synchronously rectified into a waveform approximate or similar to that of a voltage of the commercial AC input power through reversal of one waveform. Further, the synchronously rectified AC power, of which high-frequency components are removed by the smoothing filter 19, is demodulated into AC output power having waveforms of a desired voltage and current. Then, the AC output power is supplied to the load 11 stably.

On the other hand, the high-frequency AC power induced in the tertiary winding n3 of the high-frequency transformer 16 is provided to the DC-HFAC converter 17 which is a battery charger. The high-frequency AC power is rectified into DC power by the semiconductor switches S7 and S8 whose drive-pulse phases are modulated by means of the control circuit 21. And with this DC power, the storage battery 7 is charged.

In the emergency mode of operation, upon the occurrence of an emergency such as a service interruption in which supply of AC input power from the commercial AC power source 20 is discontinued, the control circuit 21 detects this emergency, for example. Upon the detection, in the DC-HFAC converter 17, DC power from the storage battery 7 is converted into high-frequency AC power, which is to be applied to the tertiary winding n3 of the high-frequency transformer 16, by the semiconductor switches S7 and S8 whose drive-pulse phases are modulated by means of the control circuit 21. Then, high-frequency AC power induced in the secondary winding n2 from the tertiary winding n3 is averaged by the semiconductor switches S5 and S6 in the HFAC-AC converter 15, thereby producing AC output power. And then, stably, the AC output power is supplied to the load 11.

Furthermore, both in the ordinary times mode and emergency mode of operation, it is possible to adjust the voltage amplitude of AC output power easily and arbitrarily by modulating and inverting drive-pulse phases of the semiconductor switches S5 and S6 by means of the control circuit 21.

Figure 4:
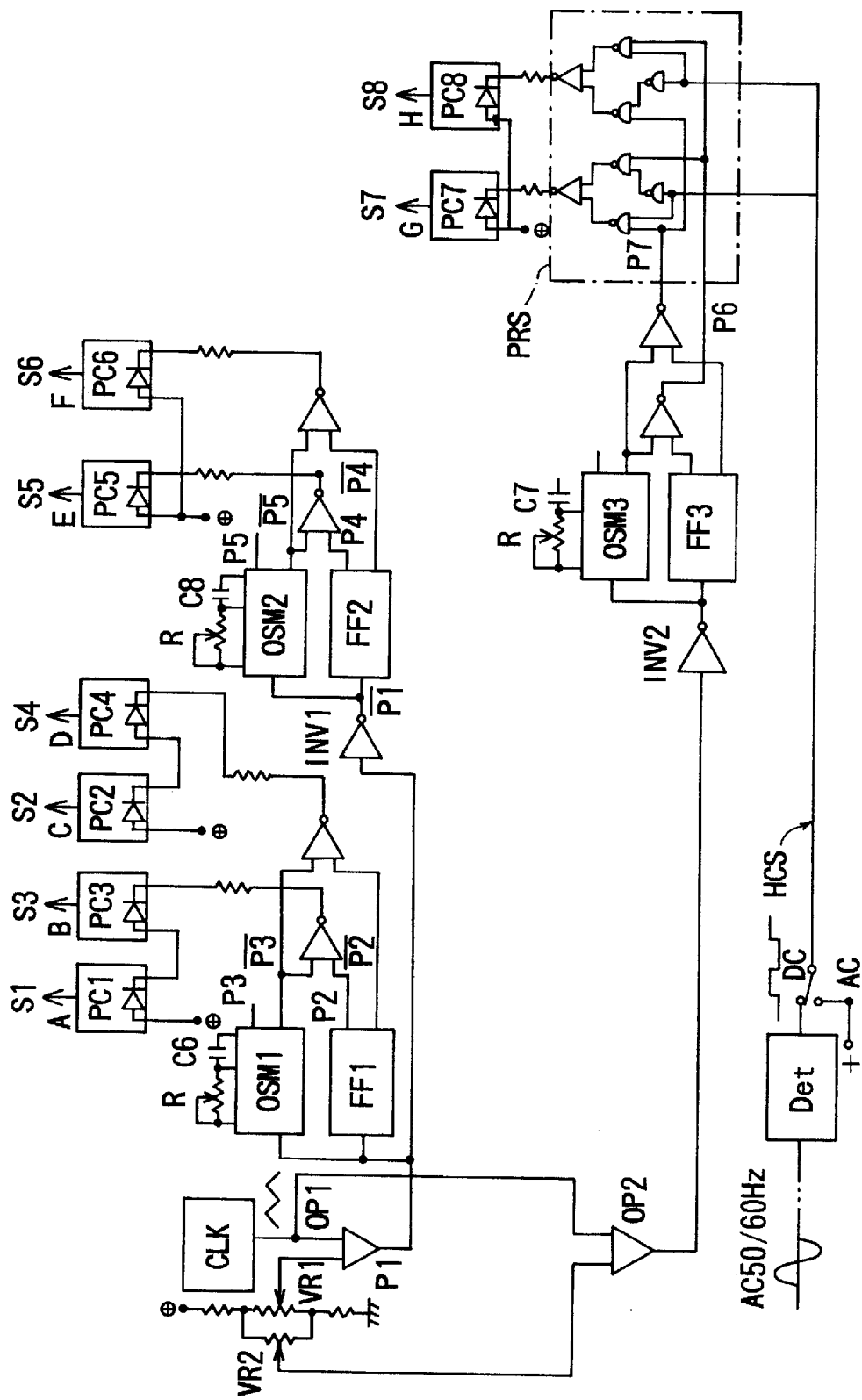
FIG. 4 is a schematic diagram of a control circuit which modulates and inverts a drive-pulse phase of each of the semiconductor switches S1, S2, S3, S4, S5, S6, S7 and S8 of the uninterruptible power supply of FIG. 3.

A schematic circuit diagram of the control circuit 21 performing such modulation and inversion of drive-pulse phases of the semiconductor switches S1, S2, S3, S4, S5, S6, S7 and S8 is shown in FIG. 4 as an example. And, in FIG. 5, a drive sequence for the semiconductor switches S1, S2, S3, S4, S5 and S6 is illustrated schematically.

Figure 5:
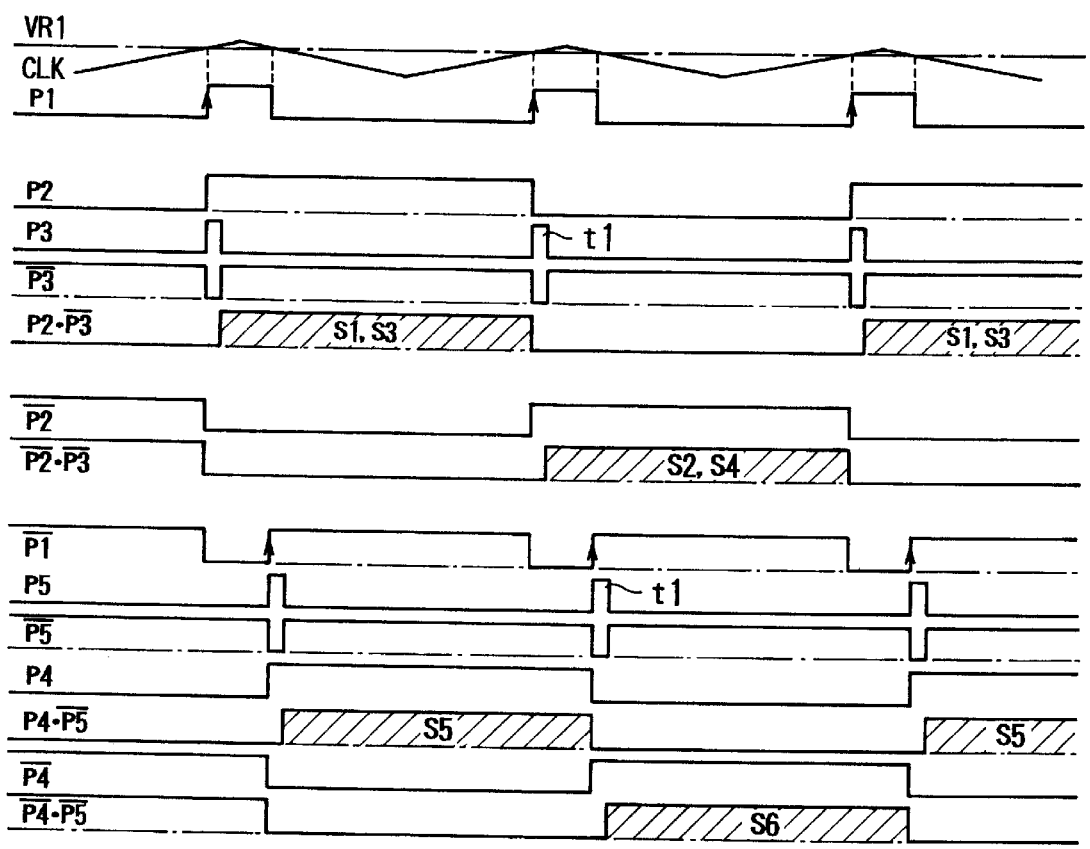
FIG. 5 illustrates a drive sequence for the semiconductor switches S1, S2, S3, S4, S5 and S6 in the control circuit of FIG. 4.

Referring to FIG. 4 and FIG. 5, for driving the semiconductor switches S1, S2, S3 and S4 of the UPS of FIG. 3, for example, a triangular wave clock-signal generated by a clock-signal generator CLK is compared with a reference voltage VR1 in an operational amplifier OP1, thereby making a pulse P1, which is provided to a flip-flop FF1 and a monostable multivibrator OSM1. From the flip-flop FF1, a pulse P2 and a pulse $\overline{P2}$ which is a negation of the pulse P2 are produced, and from the monostable multivibrator OSM1, a pulse P3 and a pulse $\overline{P3}$ which is a negation of the pulse P3 are produced. Then, with an output pulse of the logical product P2·$\overline{P3}$ the semiconductor switches S1 and P4 are driven through optically coupled drivers PC1 and PC3 respectively, and with an output pulse of the logical product $\overline{P2}$·P3 the semiconductor switches S2 and S4 are driven through optically coupled drivers PC2 and PC4 respectively. In addition, the semiconductor switches S1 and S3 and the semiconductor switches S2 and S4 are, for example, driven with a short-circuit protection time t1 of some 1$\mu$ seconds. This short-circuit protection time t1 is set by the monostable multivibrator OSM1.

For driving the semiconductor switches S5 and S6, for example, the pulse P1 from the operational amplifier OP1 is provided to an INV1. Then, from the INV1, a pulse $\overline{P1}$ which is a negation of the pulse P1 is produced and applied to a flip-flop FF2 and monostable multivibrator OSM2. From the flip-flop FF2, a pulse P4 and a pulse $\overline{P4}$ which is a negation of the pulse P4 is produced, and from the monostable multivibrator OSM2, a pulse P5 and a pulse $\overline{P5}$ which is a negation of the pulse P5 is produced. Then, with an output pulse of the logical product P4·$\overline{P5}$, the semiconductor switches S5 is driven through an optically coupled driver PC5, and with an output pulse of the logical product $\overline{P4}$·P5, the semiconductor switches S6 is driven through an optically coupled driver PC6. The semiconductor switches S5 and S6 are also driven with a short-circuit protection time ti set by the monostable multivibrator OSM2.

For driving the semiconductor switches S7 and S8, for example, an output of the operational amplifier OP2 is obtained by comparison between the rectangular wave clock-signal and a reference voltage VR2(not shown), and a negation of the output is produced by an INV2 and applied to a flip-flop FF3 and a monostable multivibrator OSM3. Then, with the logical product of outputs of the flip-flop FF3 and the monostable multivibrator OSM3, the semiconductor switches S7 and S8 are driven through a pulse phase reverse switch PRS and optically coupled drivers PC7 and PC8, respectively. The pulse phase reverse switch PRS is operated in accordance with a half cycle sequence HCS provided by a positive/negative polar detector Det which detects positive/negative polar of the commercial AC input voltage.

In the control circuit shown in FIG. 4, as is clearly seen from FIG. 5, by changing a voltage value of the reference voltage VR1 within the range of nearly the least value and the most value, it is possible to change an on/off ratio, i.e., a duty ratio, of the pulse P1 provided by the operational amplifier OP1 within the range of approximately 2% to 98%. Therefore, high-frequency drive-pulse phases of the semiconductor switches S1, S2, S3 and S4 relative to those of the semiconductor switches S5 and S6, or vice versa, can be modulated by adjusting the voltage value of the reference voltage VR1.

Figure 6:
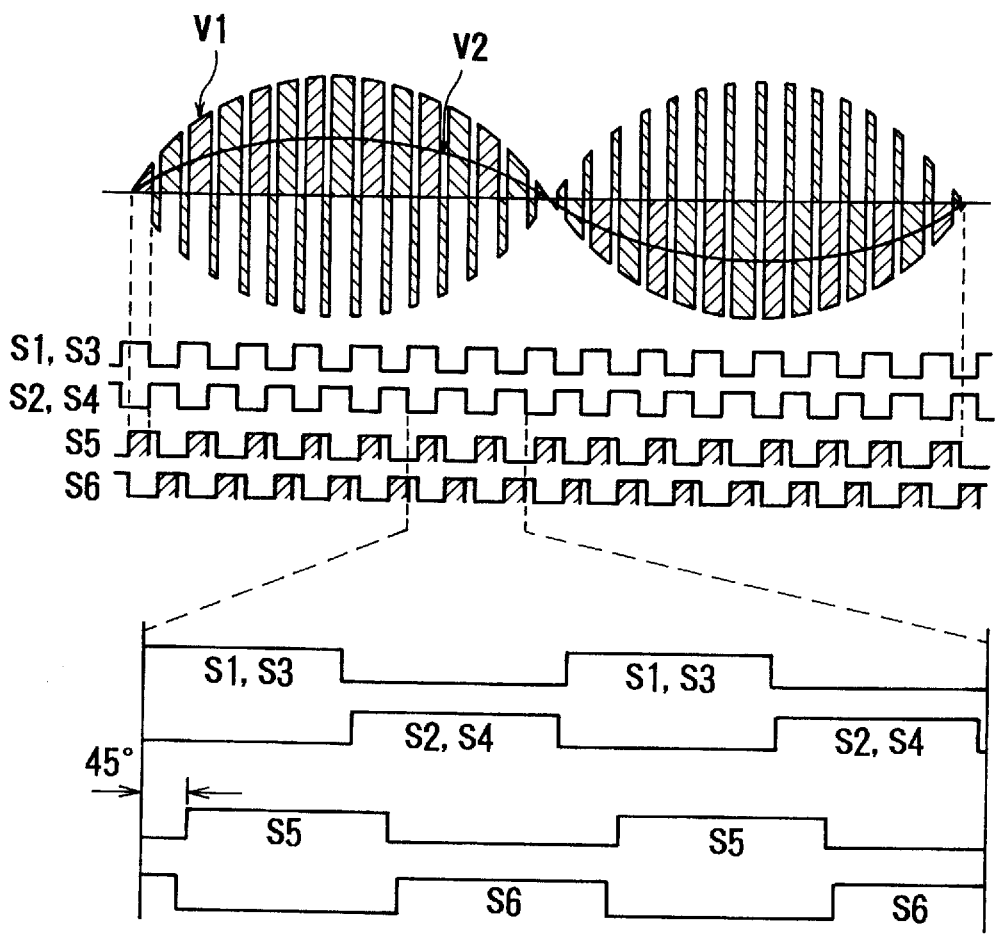
FIG. 6 illustrates the relation between a drive-pulse phase of each of the semiconductor switches S1, S2, S3, S4, S5 and S6 with a phase difference of 45° and output voltages of the synchronous rectifier and the LC filter of the uninterruptible power supply of FIG. 3.

FIG. 6 illustrates the relation between drive-pulse phases of the semiconductor switches S1, S2, S3 and S4 and of the semiconductor switches S5 and S6 and output voltages V1 and V2 of the synchronous rectifier and LC filter of the UPS of FIG. 3. As shown in FIG. 6, for example, as the semiconductor switches S1 and S3 and the semiconductor switches S2 and S4 are alternately turned on and off, and as the semiconductor switches S5 and S6 are alternately turned on and off with a phase-lag of 45° relative to the drive-pulse phases of the semiconductor switches S1 and S3 and to the drive-pulse phases of the semiconductor switches S2 and S4, respectively, by means of the control circuit 21 shown in FIG. 4, the output voltage V2 of the LC filter 19, which is to be applied to the load 11 as an AC output voltage of the UPS of FIG. 3, becomes about a half the maximum amplitude, i.e., the output voltage V1 of the synchronous rectifier 18.

Each of FIG. 7A, FIG. 7B, FIG. 7C, FIG. 7D and FIG. 7E shows a pulse waveform of each of the semiconductor switches S3, S5 and S6 modulated with a phase difference of 0°, 45°, 90°, 135° and 180°, respectively, by the control circuit 21, and an output voltage waveform of the LC filter 19, and an AC input voltage waveform of the commercial AC power source 20. In FIGS. 7A–7E, drive-pulse phases of only the semiconductor switches S3, S5 and S6 are shown to simplify the description. The semiconductor switch S1 is in phase with the semiconductor switch S3, and the semiconductor switches S2 and S4 are in negative phase with the semiconductor switch S3. The semiconductor switch S5 is controlled so as to modulate its drive-pulse phase with a phase difference relative to the drive-pulse phase of the semiconductor switch S3, and the semiconductor switch S6 is controlled so as to modulate its drive-pulse phase with a phase difference relative to the drive-pulse phase of the semiconductor switch S4.

Figure 7A:
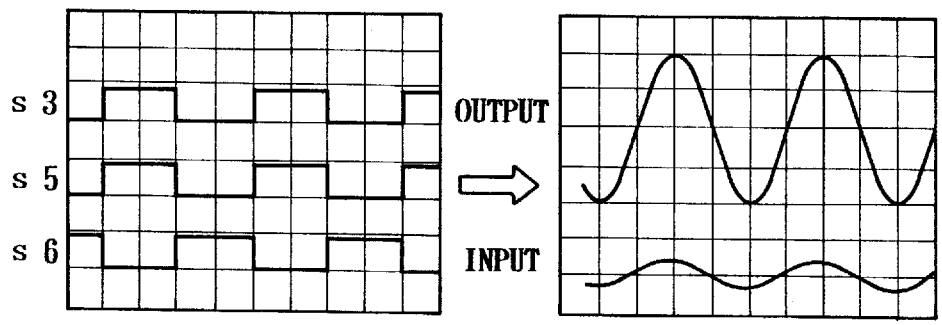
FIG. 7A shows a drive-pulse waveform of each of the semiconductor switches S3, S5 and S6, an input voltage waveform and an output voltage waveform in the uninterruptible power supply of FIG. 3 in the case of a phase difference of 0°.
Figure 7B:
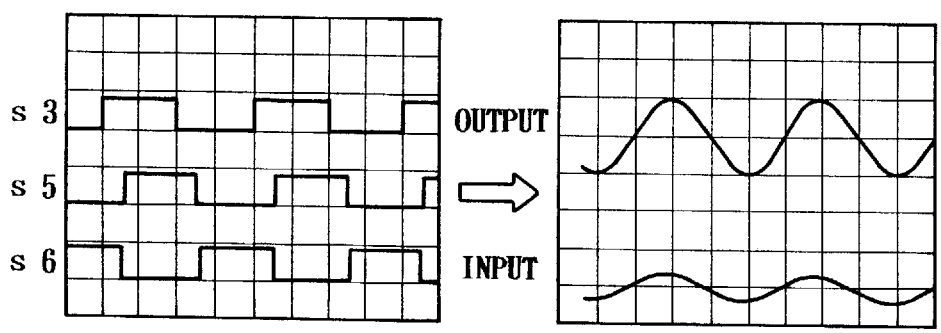
FIG. 7B shows a drive-pulse waveform of each of the semiconductor switches S3, S5 and S6, an input voltage waveform and an output voltage waveform in the uninterruptible power supply of FIG. 3 in the case of a phase difference of 45°.
Figure 7C:
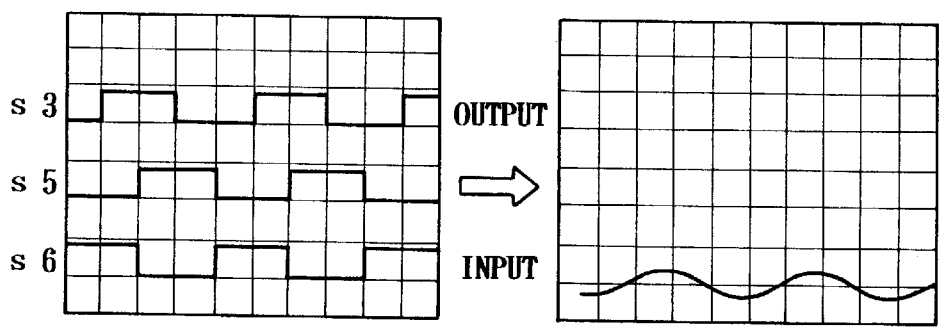
FIG. 7C shows a drive-pulse waveform of each of the semiconductor switches S3, S5 and S6, an input voltage waveform and an output voltage waveform in the uninterruptible power supply of FIG. 3 in the case of a phase difference of 90°.
Figure 7D:
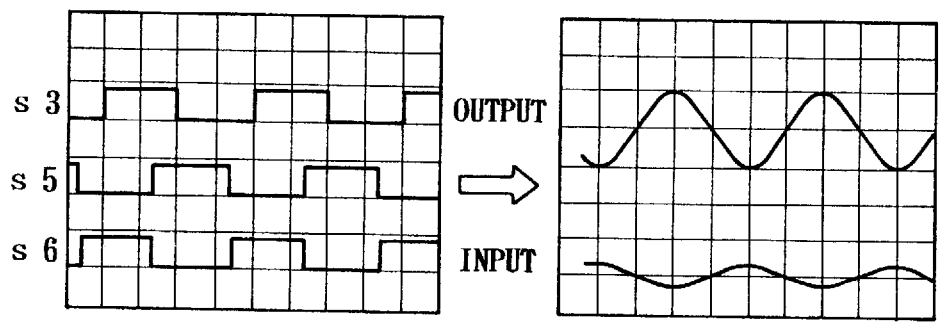
FIG. 7D shows a drive-pulse waveform of each of the semiconductor switches S3, S5 and S6, an input voltage waveform and an output voltage waveform in the uninterruptible power supply of FIG. 3 in the case of a phase difference of 135°.

As shown in FIG. 7A, when the drive-pulse phase is modulated so that the phase difference between the semiconductor switches S3 and S5 becomes 0° and the phase difference between the semiconductor switches S4 and S6 becomes 0°, the output voltage becomes a maximum amplitude with a positive phase. When the drive-pulse phase is modulated so that the phase difference between the semiconductor switches S3 and S5 and phase difference between the semiconductor switches S4 and S6 becomes 45°, the output voltage becomes a half of the maximum amplitude with a positive phase as shown in FIG. 7B. With the phase difference of 90°, the output voltage becomes null as shown in FIG. 7C. Furthermore, when the phase difference is modulated to be 135°, the output voltage of an amplitude a half the maximum with negative phase is generated as shown in FIG. 7D. And, with the phase difference of 180°, the output voltage having a maximum amplitude with negative phase is obtained as shown in FIG. 7E.

Accordingly, in the UPS shown in FIG. 3 as a preferred embodiment of the present invention, by modulating the drive-pulse phases of the semiconductor switches S1, S2, S3 and S4 and of the semiconductor switches S5 and S6 as described above, it is possible to easily and arbitrarily adjust amplitude and positive/negative phase of the AC output voltage, and to supply the AC output power having a desired voltage to the load 11.

Figure 7E:
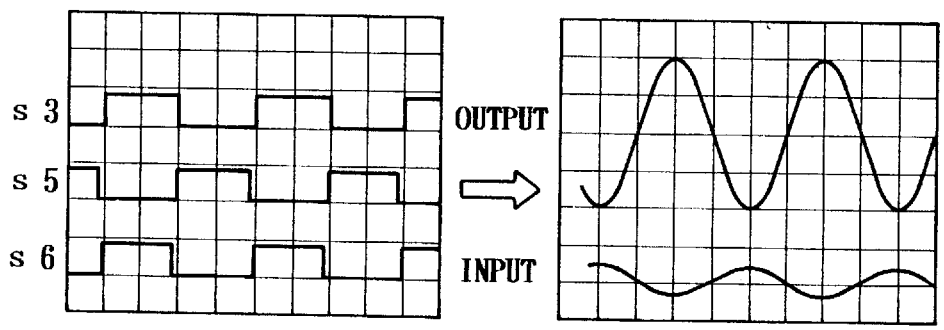
FIG. 7E shows a drive-pulse waveform of each of the semiconductor switches S3, S5 and S6, an input voltage waveform and an output voltage waveform in the uninterruptible power supply of FIG. 3 in the case of a phase difference of 180°.

Moreover, as is clear from FIG. 7A and FIG. 7E, in cases with the phase difference of 0° and 180° where the drive-pulse phases of the semiconductor switches S5 and S6 are completely inverted relative to the drive-pulse phases of the semiconductor switches S3 and S4, respectively, phases of the output voltage are inverted between positive and negative. Thus, by inverting the drive-pulse phases of the semiconductor switches S5 and S6 for each positive and negative half cycle of the input AC waveform, a DC waveform in which the output waveform shown in FIG. 7A and the output waveform shown in FIG. 7E appear alternately for each half cycle of the frequency of the commercial AC input power is obtained.

Figure 8:
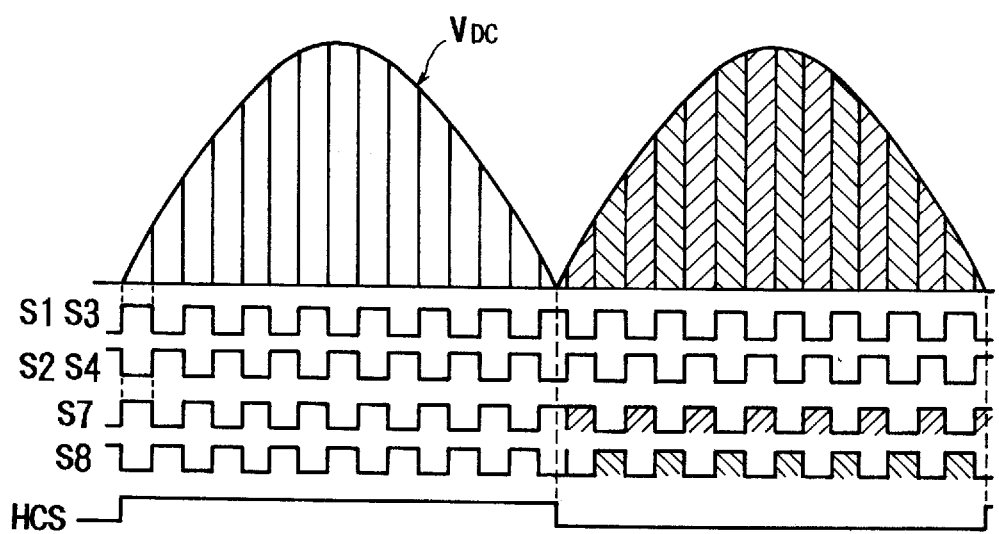
FIG. 8 illustrates the relation between inversion of drive-pulse phases of the semiconductor switches in accordance with a half cycle sequence HCS and a DC output voltage.

It is therefore possible to easily rectify the high-frequency AC power induced in the tertiary winding n3 of the high-frequency transformer 16 into DC power by applying such inversion control to drive-pulse phases of the semiconductor switches S7 and S8, that is, inverting the drive-pulse phase of the semiconductor switch S7 and that of the semiconductor switch S8 for each half cycle of the commercial AC input frequency as shown in FIG. 8, for example by the use of the pulse phase reverse switch PRS of the control circuit of FIG. 4.

Such inversion of the drive-pulse phases of the semiconductor switches S7 and S8 can be accomplished, for example, in accordance with logic 1·0 of the half cycle sequence HCS provided by the positive/negative polar detector Det installed in the control circuit of FIG. 4, distinguishing positive and negative half cycles of the commercial AC input frequency.

Figure 9A:
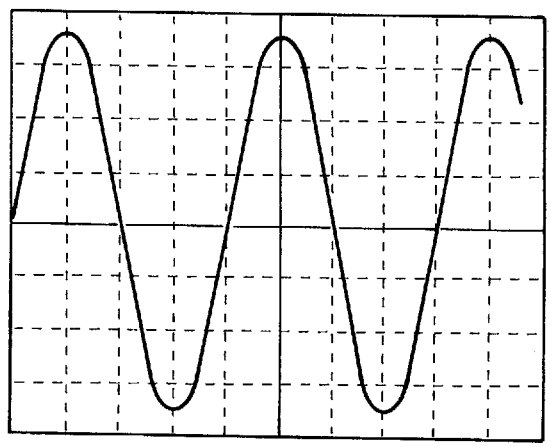
FIG. 9A shows a voltage waveform of commercial AC input power in the uninterruptible power supply of FIG. 3.
Figure 9B:
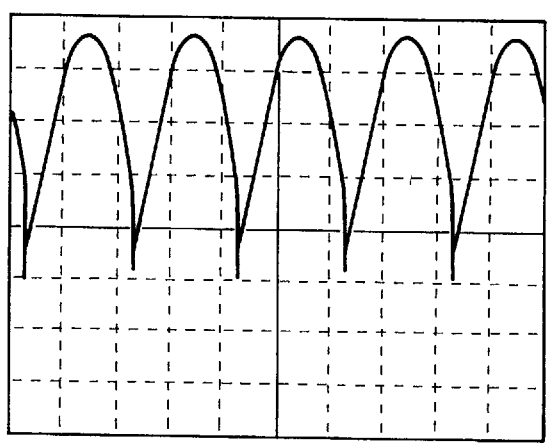
FIG. 9B shows a voltage waveform of DC output power generated by rectifying the commercial AC input power having the voltage waveform shown in FIG. 9a in the uninterruptible power supply of FIG. 3.

As a result of inverting the drive-pulse phases of the semiconductor switches S7 and S8 synchronously with the commercial AC input frequency and in accordance with the logic 1·0 of the half cycle sequence HCS by the use of the pulse phase reverse switch PRS, commercial AC input power having a voltage waveform as shown in FIG. 9A is rectified into DC power having a voltage waveform as shown in FIG. 9B.

Also, the drive-pulse phase of each of the semiconductor switches S7 and S8 can be modulated within each half cycle of the commercial AC input frequency. Thus, by such modulation of drive-pulse phases within each half cycle and inversion of drive-pulse phases for each half cycle, it is possible to rectify AC power adjusting its voltage and thereby generate DC power having a desired voltage easily.

As described above, in the ordinary times mode of operation, that is when the UPS is operated at ordinary times, by modulating and inverting drive-pulse phase of each of the semiconductor switches, modulation of commercial AC input power into high-frequency AC power and demodulation of high-frequency AC power induced in the secondary winding n2 into AC output power is accomplished and then the AC output power with an adjusted voltage is supplied to the load 11, and at the same time, rectification of high-frequency AC power induced in the tertiary winding n3 into DC power is accomplished and then the storage battery 7 is charged with the DC power whose voltage is adjusted, in accordance with the present invention.

In addition, a battery charger having a satisfactory power factor can be achieved by controlling the semiconductor switches S7 and S8 such that those switches drive with a constant current only when a voltage induced to the tertiary winding n3 exceeds a voltage of the storage battery 7.

Figure 10A:
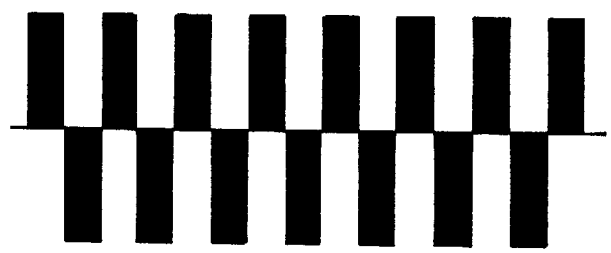
FIG. 10A illustrates a square-wave inverter output generated at the semiconductor switches S7 and S8.
Figure 10B:
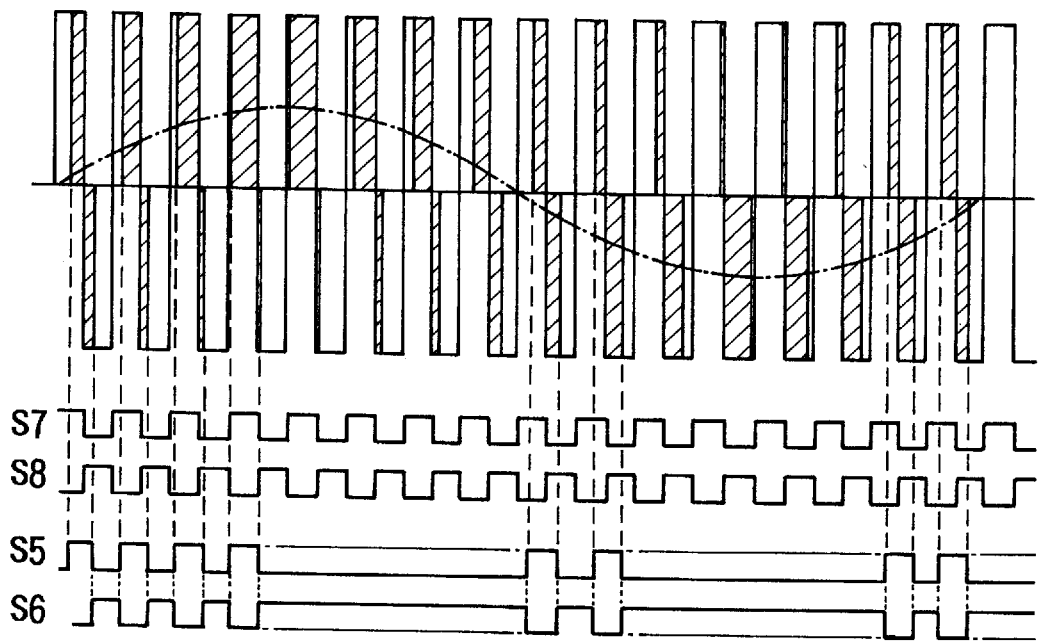
FIG. 10B illustrates an output voltage waveform generated by sine-wave-like modulation of a drive-pulse phase of each of the semiconductor switches S5 and S6.

On the other hand, in the emergency mode of operation, upon detection of an emergency, the control circuit 21 stops the operation of the AC-HFAC converter 14, that is the operation of the semiconductor switches S1, S2, S3 and S4, and instead, starts the DC-HFAC converter 17 to operates as an inverter circuit, in other words, starts the semiconductor switches S7 and S8 to operate as switches of the inverter circuit, thereby supplying energy from the storage battery 7 to the load 11. At this point, the semiconductor switches S7 and S8 are controlled so that an averaged output of the LC filter 19, which is supplied to the load 11 as AC output power, becomes a sine wave. Such control is achieved by applying a drive-signal with the duty ratio of a little under 50% (for example) to the semiconductor switches S7 and S8 in order to generate an inverter output having a square waveform as illustrated in FIG. 10A and also by modulating, as illustrated in FIG. 10B, drive-pulse phases of the semiconductor switches S5 and S6 so that the average value of the output voltage of the synchronous rectifier 18 becomes sine-wave-like relative to the square wave inverter output generated in the semiconductor switches S7 and S8.

Figure 11:
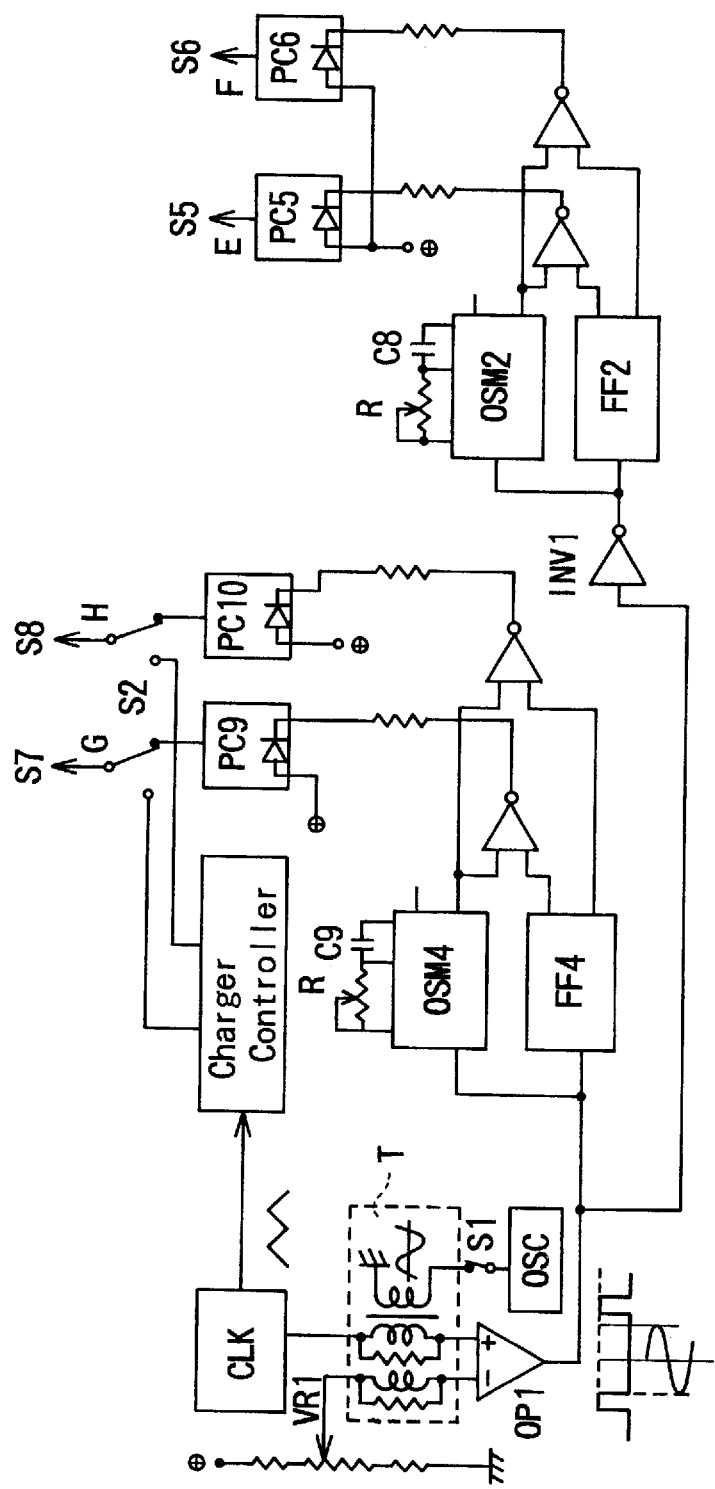
FIG. 11 is a schematic representation of a control circuit which modulates and inverts a drive-pulse phase of each of the semiconductor switches S5, S6, S7 and S8.

A schematic representation of a control circuit which modulates and inverts, in an emergency, a drive-pulse phase of each of the semiconductor switches S5, S6, S7 and S8 is shown in FIG. 11. In FIG. 11, a letter T represents a sine-wave modulating transformer, S1 and S2 are switches which operates only in an emergency, OSC is a sine-wave oscillator which generates a sine wave of a 50 or 60 Hz frequency, FF4 is a flip-flop, OSM4 is a monostable multivibrator, PC9 and PC10 are optically coupled drivers, and the other components are the same as in FIG. 4.

Figure 12:
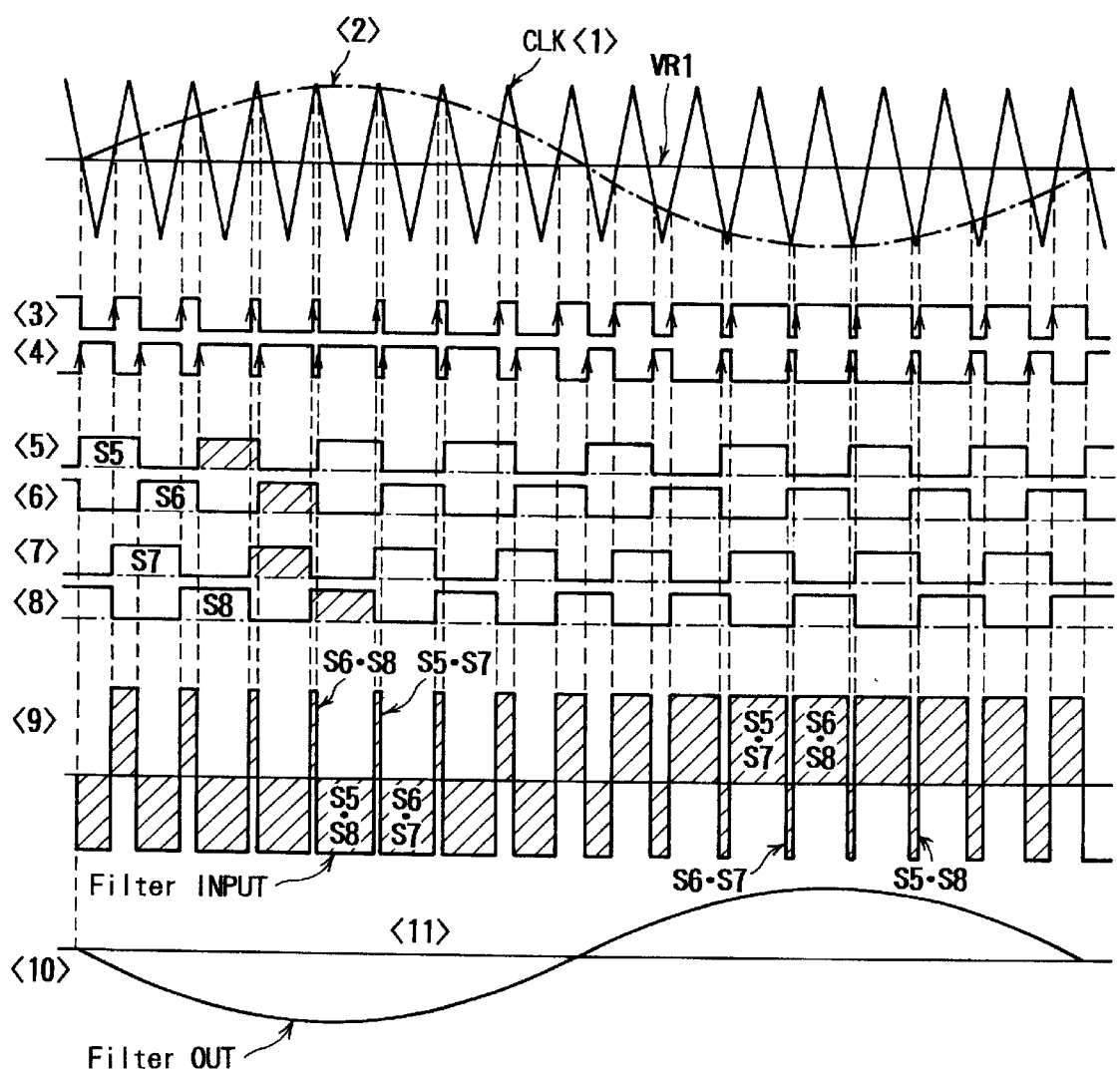
FIG. 12 illustrates a drive sequence for the semiconductor switches S5, S6, S7 and S8 in the control circuit of FIG. 11, and an input voltage and an output voltage of the smoothing filter of the uninterruptible power supply of FIG. 3.

FIG. 12 illustrates a drive sequence for each of the semiconductor switches S5, S6, S7 and S8, and also AC output voltages.

Referring to FIG. 11 and FIG. 12, for example, first of all, the reference voltage VR1 is set to the center value of a triangular wave clock-signal<1>generated by the clock-signal generator CLK, then when the switch S1 is opened, an output<3> of the operational amplifier OP1 having a square wave of the duty ratio of 50% is obtained, and when the switch S2 is closed, the output voltage becomes 0 shown as the waveform<11>. When the switch S1 is closed, for example, a sine-wave voltage<2> is applied to the operational amplifier OP1, then the output<3> of the operational amplifier OP1 is generated by a difference voltage between the triangular wave clock-signal<1> and sine-wave voltage<2>. This output<3> of the operational amplifier OP1 is provided to the flip-flop FF2 and the monostable multivibrator OSM2, and the logical product of outputs of the flip-flop FF2 and the monostable multivibrator OSM2 is obtained. Then, with the drive-pulse phases<5> and <6>, the semiconductor switches S5 and S6 are driven through the optically coupled drivers PC5 and PC6, respectively.

On the other hand, the semiconductor switches S7 and S8 are driven with drive-pulse phases<7> and <8> to which sine-wave modulation in response to the sine-wave voltage<2> is applied.

In the UPS of FIG. 3, although the square-wave inverter output voltage of the high-frequency transformer 16 is the same as the drive-pulse phases<7> and <8>, the voltage waveform rectified by the semiconductor switches S5 and S6 in the synchronous rectifier 18, which is to be applied between the input terminals of the smoothing filter 19, becomes a square wave asymmetrical in up and down sides like a waveform<9>, and an output voltage of the smoothing filter<19>, i.e., an AC output voltage, becomes a waveform<10> substantially close to a sine wave.

If the modulation amplitude of the sine-wave voltage<2> is decreased to half, the amplitude of the output waveform of the smoothing filter<19> also decreases to half. Thus, the AC output voltage can be changed in proportion to the modulation amplitude of the transformer T in the control circuit of FIG. 11.

Hence, according to the present invention, it is possible to adjust an output voltage substantially close to a sine wave, that is an AC output voltage to be supplied to the load 11, by means of the tertiary winding n3 of the high-frequency transformer 16 and by modulating the drive-pulse phase of each of the semiconductor switches both at ordinary times and in an emergency.

When the UPS shown in FIG. 3 as a preferred embodiment of the present invention, which performs operations described above both at ordinary times and in an emergency, is to provide an output of 1 kW AC power with a frequency within the range of from 20 to 30 kHz, the UPS apparatus may be composed of a high-frequency transformer such as EI-60, for example, having a maximum size of 6 cm and a weight of about 300 g, a noise filter and LC filter of a far smaller core, very compact and light-weight semiconductor switches, and a drive control thereof. Moreover, in such a UPS, an efficiency of about 80 to 85% is obtained in the ordinary times of operation.

Therefore, as compared with a conventional UPS such as the one shown in FIG. 1, the UPS in accordance with the method of the present invention is excellent in efficiency and power factor, very compact in size, light in weight and low in cost, and can be incorporated into an on-line equipment of a small capacity.

Furthermore, a schematic representation of a UPS as another embodiment of the present invention is shown in each of FIG. 13, FIG. 14, FIG. 15 and FIG. 16. In the depicted UPSs, INV represents an inverter, CHG is a battery charger, and as semiconductor switches S9 to S24, uni-directional semiconductor switches are used instead of the bi-directional semiconductor switches used in the DC-HFAC converter 17 of the UPS shown in FIG. 3.

Figure 13:
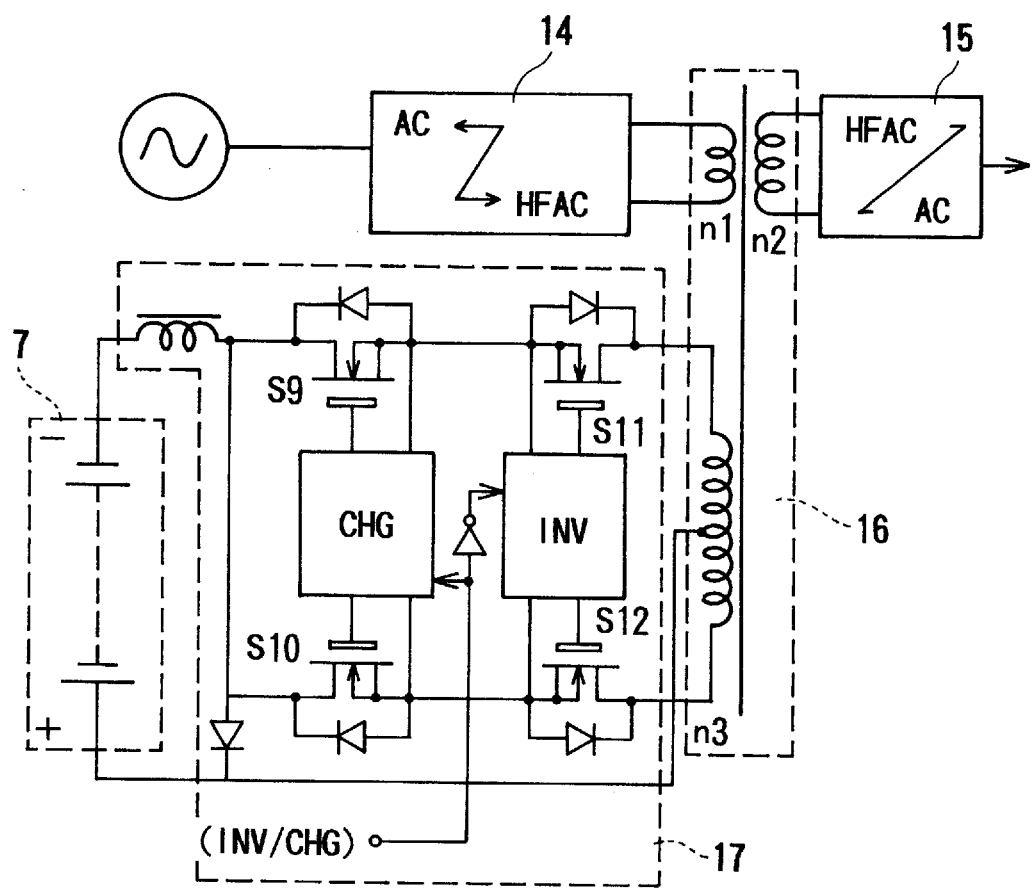
FIG. 13 is a schematic representation of an uninterruptible power supply as another embodiment of the present invention.

In the DC-HFAC converter 17 of the UPS shown in FIG. 13, the uni-directional semiconductor switches S11 and S12 and the inverter INV constitute a push-pull square-wave inverter, and the uni-directional semiconductor switches S9 and S10 and the battery charger CHG constitute a charging circuit. By means of the unidirectional semiconductor switches S9 and S10, two-phase half wave charging control is performed.

Figure 14:
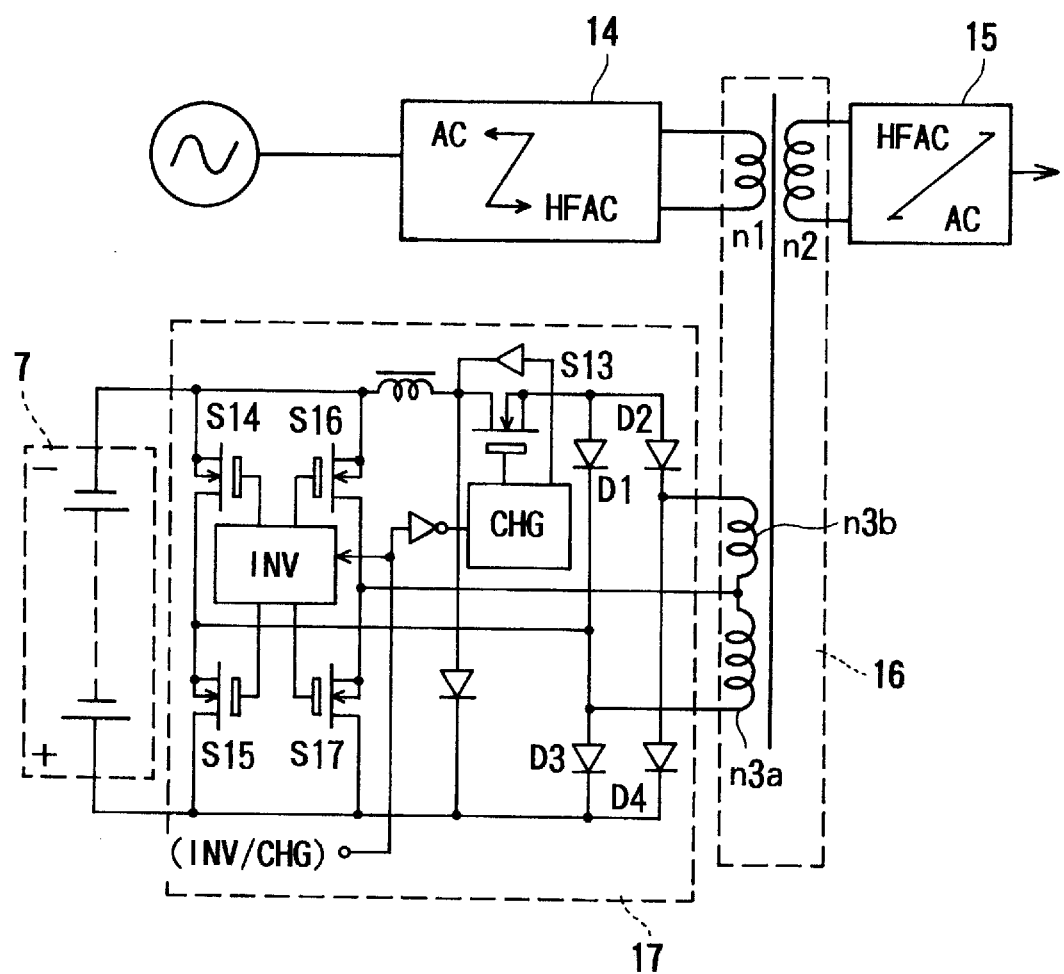
FIG. 14 is a schematic representation of an uninterruptible power supply of a relatively large capacity as another embodiment of the present invention.

FIG. 14 shows a circuit diagram of the DC-HFAC converter 17 in the UPS with a relatively large capacity. In the depicted DC-HFAC converter 17, the uni-directional semiconductor switches S14, S15, S16 and S17 and the inverter INV constitute a bridge inverter, and an output of the bridge inverter is added to a tertiary winding n3a of the high-frequency transformer 16. Further, a high-frequency rectifier comprising the semiconductor switch S13 and diodes D1, D2, D3 and D4 and the battery charger CHG together constitute a charging circuit. AC voltage of the tertiary winding n3a and a tertiary winding n3b of the high-frequency transformer 16 are full-wave rectified into a DC voltage by the high-frequency rectifier. Then, by a switching of the semiconductor switch S13, charging control with a high power-factor is performed, and, with the DC voltage, the storage battery 7 is charged.

Figure 15:
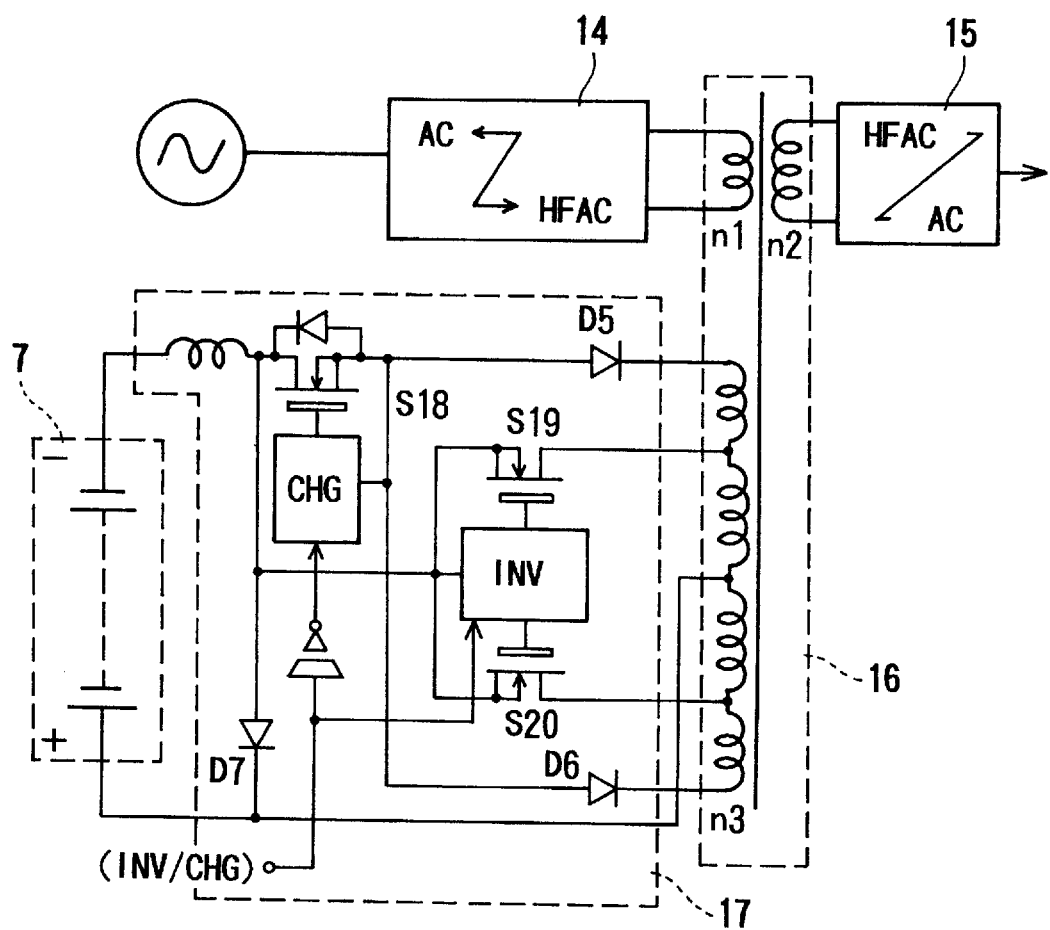
FIG. 15 is a schematic representation of an uninterruptible power supply of a relatively small capacity as another embodiment of the present invention.

FIG. 15 shows a circuit diagram of the DC-HFAC converter 17 in the UPS with a relatively small capacity. In FIG. 14a, the uni-directional semiconductor switches S19 and S20 and the inverter INV constitute a push-pull inverter, and a high-frequency rectifier comprising the semiconductor switch S18 and diodes D5 and D6 and the battery charger CHG together constitute a charging circuit. By switching of the semiconductor switch S18, charging control with a high power-factor is performed. A diode D7 is a fly wheel diode.

Figure 16:
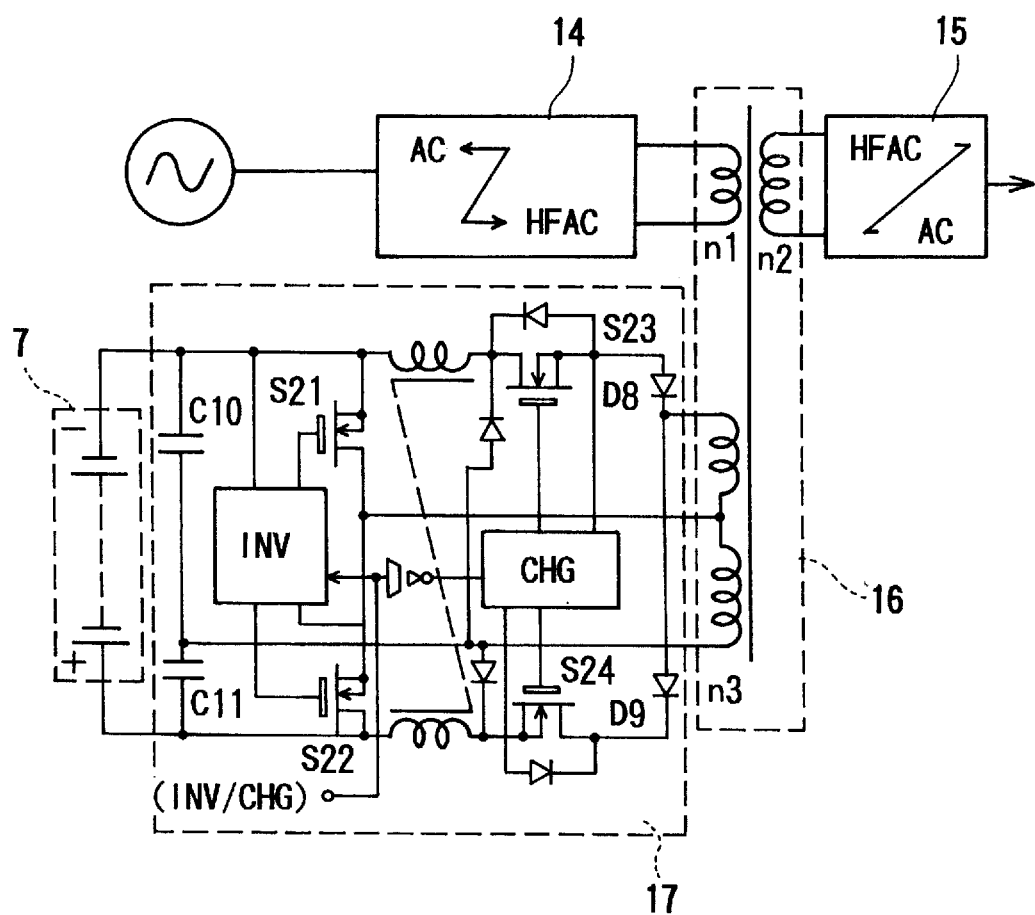
FIG. 16 is a schematic representation of an uninterruptible power supply with a storage battery of a relatively high voltage as another embodiment of the present invention.

FIG. 16 is a circuit diagram of the DC-HFAC converter 17 in the UPS with a storage battery of a relatively high voltage. The semiconductor switches S21 and S22 and capacitors C10 and C11 and the inverter INV constitute a half-bridge inverter. Diodes D8 and D9 and capacitors C10 and C11 constitute a voltage double rectifier, and further, the voltage double rectifier and the battery charger CHG and semiconductor switches S23 and S24 constitute a charging circuit. Switching for charging control with a high power-factor is performed by the semiconductor switches S23 and S24.

In any of the UPSs shown in FIGS. 13–16, it is possible to reduce restriction on the turn ratio of the high-frequency transformer 16 upon charging and inverter driving, to easily select a voltage for the tertiary winding n3 upon driving the DC-HFAC converter 17 as an inverter and as an charger, and to maintain an appropriate usage ratio of the high-frequency transformer 16.

These UPSs are also excellent in efficiency and power factor, very small in size, light in weight, and low in cost.

Although there have been described above specific arrangements of uninterruptible power supplies in accordance with the invention, it will be appreciated that the invention is not limited thereto. Accordingly, any and all modifications, variations or equivalent arrangements which may occur to those skilled in the art should be considered to be within the scope of the invention.

We claim:

1. A method of providing an uninterruptible supply of power to a load during an ordinary times mode and in an emergency mode, said method comprising, during the ordinary times mode, the steps of:
    modulating commercial AC input power into high-frequency AC power;
    applying the high-frequency AC power to a primary winding of a high-frequency transformer having the primary winding, a secondary winding and a tertiary winding;
    demodulating high-frequency AC power induced in the secondary winding from the primary winding into AC output power which is approximately equivalent to the commercial AC input power and has a waveform similar to that of the commercial AC input power;
    supplying the AC output power to the load;
    rectifying high-frequency AC power induced in the tertiary winding from the primary winding into DC power; and
    charging a storage battery with the DC power; and said method further comprising, during the emergency mode, the steps of:
    converting DC power from the storage battery into high-frequency AC power;
    applying the high-frequency AC power to the tertiary winding;
    averaging high-frequency AC power induced in the secondary winding from the tertiary winding, thereby producing AC output power; and
    supplying the AC output power to the load.

2. A method as claimed in claim 1, wherein each of the steps of said modulating commercial AC input power into high-frequency AC power, said demodulating high-frequency AC power into AC output power, said rectifying high-frequency AC power into DC power, said converting DC power into high-frequency AC power, and said averaging high-frequency AC power is accomplished by using semiconductor switches.

3. A method as in claim 2, wherein drive-pulse phases of the semiconductor switches are modulated.

4. A method as in claim 3, wherein drive-pulse phases of the semiconductor switches are modulated and inverted.

5. A method as in claim 3, wherein each of the semiconductor switches is a bi-directional semiconductor switch or a uni-directional semiconductor switch.

6. A method as in claim 2, wherein drive-pulse phases of the semiconductor switches are inverted.

7. A method as in claim 6, wherein each of the semiconductor switches is a bi-directional semiconductor switch or a uni-directional semiconductor switch.

8. A method as in claim 2, wherein drive-pulse phases of the semiconductor switches are modulated and inverted.

9. A method as in claim 8, wherein each of the semiconductor switches is a bi-directional semiconductor switch or a uni-directional semiconductor switch.

10. A method as in claim 2, wherein each of the semiconductor switches is a bi-directional semiconductor switch or a uni-directional semiconductor switch.

11. A method as in claim 2, wherein a voltage of the AC output power supplied to the load both during the ordinary times mode and during the emergency mode is adjusted.

12. A method as claimed in claim 11, wherein the adjustment of the voltage of the AC output power is achieved by using semiconductor switches.

13. A method as in claim 2, wherein the high-frequency AC power applied to the tertiary winding during the emergency mode is square wave AC.

14. A method as in claim 1, wherein a voltage of the AC output power supplied to the load both during the ordinary times mode and during the emergency mode is adjusted.

15. A method as claimed in claim 3, wherein the adjustment of the voltage of the AC output power is achieved by using semiconductor switches.

16. A method as in claim 15, wherein the high-frequency AC power applied to the tertiary winding during the emergency mode is square wave AC.

17. A method as in claim 15, wherein drive-pulse phases of the semiconductor switches are modulated.

18. A method as in claim 15, wherein drive-pulse phases of the semiconductor switches are inverted.

19. A method as in claim 15, wherein drive-pulse phases of the semiconductor switches are modulated and inverted.

20. A method as in claim 15, wherein each of the semiconductor switches is a bi-directional semiconductor switch or a uni-directional semiconductor switch.

21. A method as in claim 14, wherein the high-frequency AC power applied to the tertiary winding during the emergency mode is square wave AC.

22. A method as in claim 14, wherein drive-pulse phases of the semiconductor switches are modulated.

23. A method as in claim 14, wherein drive-pulse phases of the semiconductor switches are inverted.

24. A method as in claim 3, wherein drive-pulse phases of the semiconductor switches are modulated and inverted.

25. A method as in claim 14, wherein each of the semiconductor switches is a bi-directional semiconductor switch or a uni-directional semiconductor switch.

26. A method as in claim 1, wherein the high-frequency AC power applied to the tertiary winding during the emergency mode is square wave AC.

27. A method as claimed in claim 5, further comprising the steps of producing a sinusoidal output as the AC output power by smoothing, through the use of semiconductor switches, average values of positive and negative high-frequency square wave pulses of square wave AC induced in the secondary winding from the tertiary winding.

28. A method as in claim 27, wherein drive-pulse phases of the semiconductor switches are modulated.

29. A method as in claim 27, wherein drive-pulse phases of the semiconductor switches are inverted.

30. A method as in claim 26, wherein drive-pulse phases of the semiconductor switches are modulated and inverted.

31. A method as in claim 27, wherein drive-pulse phases of the semiconductor switches are modulated and inverted.

32. A method as in claim 27, wherein each of the semiconductor switches is a bi-directional semiconductor switch or a uni-directional semiconductor switch.

33. A method as in claim 26, wherein drive-pulse phases of the semiconductor switches are modulated.

34. A method as in claim 26, wherein drive-pulse phases of the semiconductor switches are inverted.

35. A method as in claim 26, wherein each of the semiconductor switches is a bi-directional semiconductor switch or a uni-directional semiconductor switch.

* * * * *